March 5, 1940.  R. S. CONDON  2,192,539
TRANSMISSION OR THE LIKE
Filed Jan. 15, 1937  4 Sheets-Sheet 1

March 5, 1940.    R. S. CONDON    2,192,539
TRANSMISSION OR THE LIKE
Filed Jan. 15, 1937    4 Sheets-Sheet 2

INVENTOR
BY
ATTORNEYS

March 5, 1940.  R. S. CONDON  2,192,539
TRANSMISSION OR THE LIKE
Filed Jan. 15, 1937  4 Sheets-Sheet 3

INVENTOR
Robert S. Condon
BY
ATTORNEYS

March 5, 1940. R. S. CONDON 2,192,539
TRANSMISSION OR THE LIKE
Filed Jan. 15, 1937 4 Sheets-Sheet 4

INVENTOR
Robert S. Condon
BY
ATTORNEYS

Patented Mar. 5, 1940

2,192,539

UNITED STATES PATENT OFFICE 2,192,539

TRANSMISSION OR THE LIKE

Robert S. Condon, Rochester, N. Y.

Application January 15, 1937, Serial No. 120,798

6 Claims. (Cl. 103—162)

This invention relates to variable speed fluid transmissions and the like; and the principal object of the invention is to provide a transmission of the above type consisting of a fluid pump actuated by a constant speed prime mover, said pump drawing fluid from an open tank and delivering same to a fluid motor from which the fluid is returned to the tank; means being provided for automatically first increasing the delivery of the pump to its maximum figure, and subsequently automatically decreasing the displacement of the pistons of the motor in order to build up the speed of the motor from a minimum to a maximum.

Further objects are to provide a unit as above described in which the parts are so arranged and associated that the prime mover is included within the floor space required for the tank, thus effecting a saving in the requisite floor space for the unit; also to provide a unit which is economical to manufacture and has novel and efficient mechanical and hydraulic features hereinafter set forth.

I will explain the invention with reference to the accompanying drawings, which illustrate practical embodiments thereof, to enable others familiar with the art to adopt and use the same; and will summarize in the claims the essential features of the invention, the novel features of construction, and novel combinations of parts, for which protection is desired.

Figure 1:
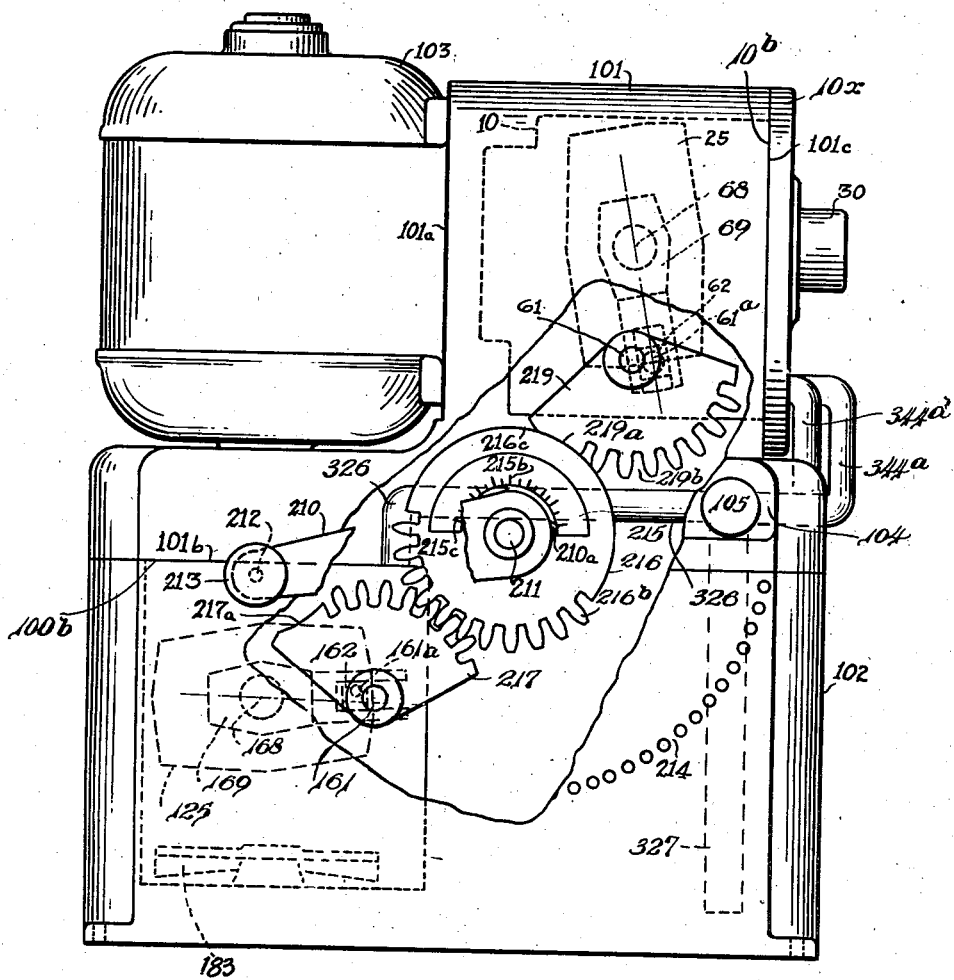
Fig. 1 is an elevation of the fluid transmission unit showing the arrangement of the parts, and also showing my preferred hand control lever and linkage including intermittent gears for operating the cradles of the pump and motor of the unit.

In brief, the fluid transmission as shown in Fig. 1 comprises a prime mover 103 which may be an electric motor, driving a fluid pump 100 associated with a fluid tank 102, and a fluid motor 10 operated by the pump 100 through a suitable fluid circuit. There is a general similarity between the pump and motor. For convenience I will first describe the motor unit.

*The motor unit*

In said drawings (Figs. 2 and 3) 10 designates the motor unit casing partly closed at end 10a. At this end 10a a cover plate 15 is applied and sealed by gasket 16, and having a shaft opening provided with a gland for packing 17. An annular bearing cap 11 is secured by screws (not shown) to the other end of the casing and sealed by gasket 12; and a closure plate 13 sealed by gasket 14 is applied to cap 11. Cover plates 13 and 15 are held in place by screws 18—18a or the like.

Cylindrical valve bushings 19 and 20 are sealed in the bore of cap 11 and in the partly closed end 10a of casing 10 respectively, the bushing 19 containing valve ports 21, 22, and bushing 20 containing ports 23 and 24. Ducts 22 and 23 are interconnected within the casing 10 by ducts 344f, 344h, and 344e, having a pipe lead 344d, while ducts 21 and 24 are interconnected within the casing by ducts 344b, 324a, and 324c having a pipe lead 344a (as shown more particularly in Fig. 7.

A shaft 30 provided with a cylindrical bearing surface 30b is journaled in bushing 20 and the outer end of said shaft is bored to receive an inverted coupling sleeve 31 which is keyed and held in position within the bore of shaft 30 by pin 32. The inner end of shaft 30 is machined as at 30a to receive a head 33 which is keyed in position by pin 30x and secured thereon by axially disposed bolt 34 locked against rotation by lock-washer 35, the head 33 forming a cylindrical bearing surface journaled in the valve bushing 19.

Within casing 10 around shaft 30 is an annular cradle 25, adjustably supported as hereinafter described with respect to the axis of the shaft. Cradle 25 has an internal annular rib 25a within which is mounted a hub formed of two annular sections 27—27a interfitted at their meeting faces, said hub 27—27a being disposed around a reduced central portion of shaft 30 and maintained in spaced relation with respect to cradle 25 by roller bearings 26, 26a so that said hub may rotate freely in any position to which it is adjusted by the cradle.

Figure 3:
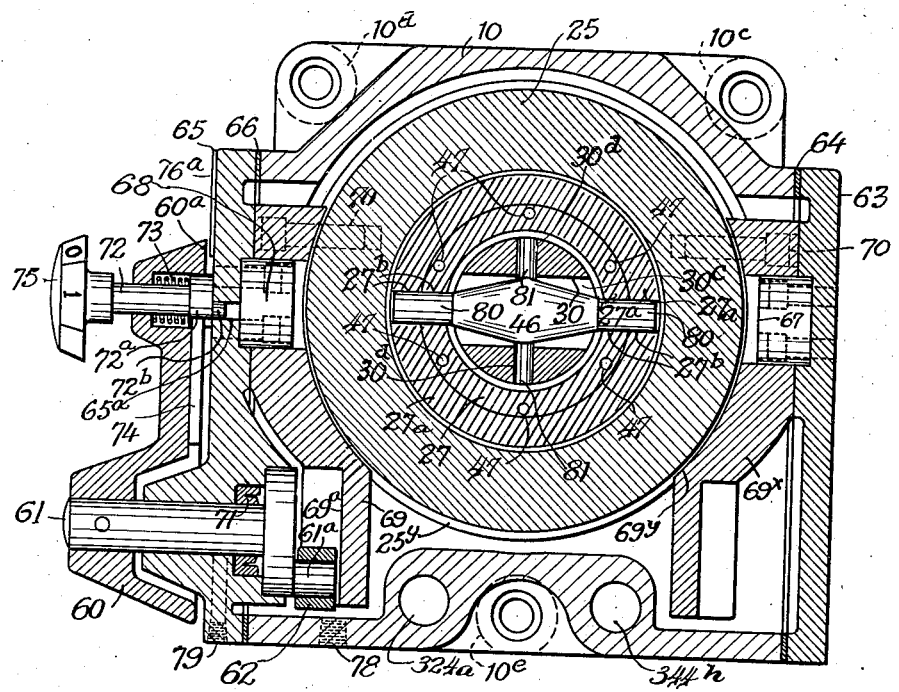
Fig. 3 is a transverse section through the motor unit showing the universal joint between the shaft and hub, also the eccentric linkages that control the stroke of the pistons according to the angularity of the cradle.

The hub 27—27a is rotated by and with shaft 30 through a universal joint connection, shown more particularly in Fig. 3, and which consists of an elongated member 46 housed in a transverse bore 30c in shaft 30, and provided with diametrically opposed pins 81 journaled in corresponding bores 30d in said shaft. Member 46 has cylindrical ends 80 entering registering bores 27b in the hub members 27—27a to effect a mechanical rotary drive between the hub and shaft, while positioning shaft 30 longitudinally of casing 10.

In the event shaft 30 and the hub 27—27a should not rotate coaxially the pins 80 and 81 may adjust themselves longitudinally in their respective bores and thus compensate for any misalignment, allowing the hub and shaft to rotate on slightly offset axes without binding.

In the inner ends of the bearing surfaces of shaft 30 and head 33 are sets of opposed cylinders 41 and 38, said cylinders being disposed at a slight angularity to the axis of shaft 30, and having their inner ends terminating opposite the ports 21, 22, 23, 24 of bushings 19 and 20. Valve ports 36 in head 33 connect the cylinders 38 with ports 22, 21 in bushing 19, while similar valve ports 36 connect the cylinders 41 in shaft 30 with ports 23 and 24 in bushing 20.

Within each of the cylinders 38 and 41 are pistons 29 having pocketed seats 29a for receiving the spherical heads 28a of piston rods 28. Piston rods 28 also have spherical heads 28b on their outer ends engaging pocketed seats in bores 27c provided in the sides of hub members 27—27a whereby the piston rods being thus seated in their pocketed bearings cannot become dislodged, thereby dispensing with the necessity of utilizing extraneous means for holding the piston rods 28 locked in their bearings.

Means are provided for altering the angularity of cradle 25 for the purpose of varying the stroke of pistons 28. As shown in Fig. 3 casing 10 is closed on one side by a plate 63, sealed by gasket 64, and carrying a pivot 67. A plate 65 is secured to the other side of casing 10, sealed by gasket 66, and carrying pivot 68. Cradle 25 is supported by cradle blocks 69 and 69x fastened by screws 70 to the cradle, the blocks also having ribs 69y positioned in groove 25y in the cradle; the blocks having bores receiving the pivots 67—68 respectively. A shaft 61 is journaled in plate 66, sealed by packing 71, and having an operating lever 60 on its outer end, and carrying on its inner end an eccentric pin 61a engaging a slide block 62 confined in a recess 69a in cradle block 69 whereby rotation of shaft 61 will tilt the cradle 25 with respect to shaft 30 and thereby vary the stroke of pistons 29 which inversely alters the speed of rotation of shaft 30 for any given volume of fluid passing through the motor. The use of the slide block 62 in the recess 69a of cradle block 69 engaged by the eccentric pin 61a of shaft 61 forms a very simple and efficient means for effecting the pivoting of the cradle 25 in order to control the strokes of the pistons.

Figures 2, 4, 5:
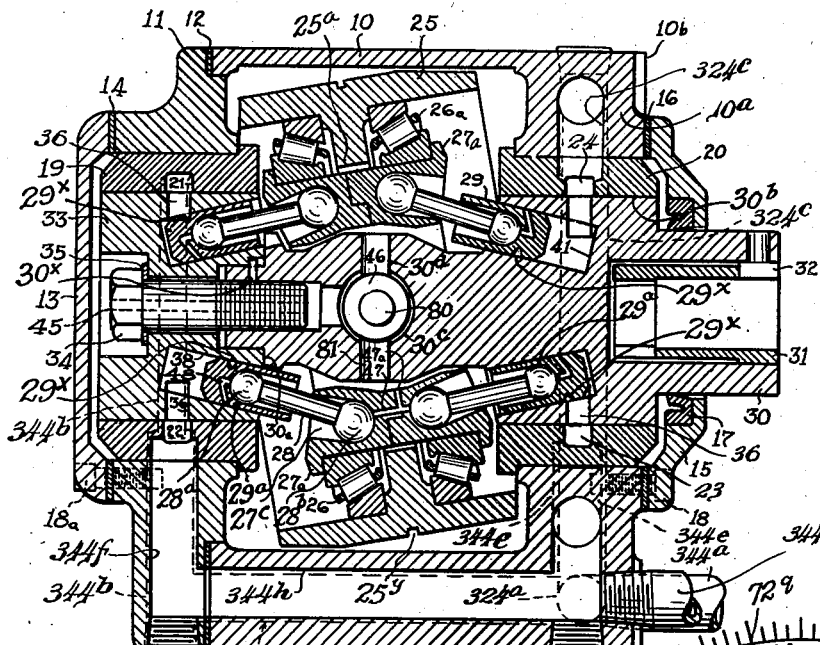
Fig. 2 is a longitudinal section through the fluid motor of the unit.
Fig. 4 is a side elevation of the motor unit showing one form of control lever.
Fig. 5 is a diagrammatic view showing the eccentric plunger of the lever shown in Fig. 4, for positively locating the lever in various determined positions.

In Figs. 3, 4 and 5 the means for properly positioning lever 60 is shown as comprising an eccentric projection 72b on the inner end of a slidable and rotatable pin 72 which carries knob 75, said projection being adapted to engage any one of a series of staggered holes 65a in plate 65 disposed in two rows (Fig. 4). Spring 73 around pin 72 interposed between arm 60 and a collar 72a on the pin serves to yieldably urge the projection 72b into hole engaging position. A key 74 mounted on lever 60 cooperates with longitudinal slots in the periphery of collar 72a and serves to position pin 72 so that the projection 72b will engage its proper hole 65a. Hand lever 60 is positioned by pulling knob 75 outwardly until collar 72a is disengaged from key 74 which operation withdraws projection 72b from its hole 65a in plate 65. Knob 75 is then rotated to the desired fractional position as indicated by the numbers 75x on knob 75, and the hand lever then moved to the approximate location desired as indicated by the position of pointer 60a on lever 60 with respect to the indicia 65b on plate 65. When knob 75 is released and lever 60 shifted slightly to either side of the approximate location, the key 74 will position pin 72 so that projection 72b will engage its proper hole 65a and accurately position pin 72, and spring 73 will hold the projection 72b in place. Fig. 5 shows four positions of pin 72 relative to lever 60 and indicates that the projection 72b must be in line with a row of holes 65a when key 74 has engaged a slot in collar 72a. These four positions of pin 72 serve to locate and retain lever 60 in definite fractional positions, the relative positions that lever 60 takes in Fig. 5 on graduations 65b on dial 65c being indicated by lines ab, cd, ef and gh, as pin 72b takes the positions 72s, 72r, 72q and 72p, respectively.

In the manufacture of the motor, valve bushings 19 and 20 can be pressed in place in cap 11 and housing 10a respectively, and the end cap 11 then bolted securely to housing 10. Also shaft 30 and its head 33 can be assembled and locked together by screw 34 and machined to perfect cylindrical form and to a size that will just enter the prepared bores in bushings 19 and 20. Thus, the fluid seal between bushing 20 and shaft bearing 30b; and between bushing 19 and head 33 can be prepared with a marked degree of accuracy, and the parts then partly disassembled to permit final assembly of the unit.

Screw 34 is drilled at 45 to convey any fluid which leaks past the fit between 19 and 33 into the bore 30c for universal joint member 46, and any fluid at that point is driven by centrifugal force into ducts 47a—47 in the hub to lubricate the heads 28b of the piston rods. Part of fluid which leaks past the fluid seals between cylinders 38—41 and pistons 29 collects in annular grooves 29x in the outer walls of pistons 29 and is conveyed through ducts 48 to lubricate the heads 28a of the piston rods. Duct 79 (Fig. 3) is arranged to convey any fluid that may leak past packing 71, and duct 78 (Fig. 3) is provided to convey away any fluid that leaks beyond the fluid seals within the motor in order to prevent any churning action on such fluid which would otherwise result when operating at high speeds.

*The pump unit*

Figure 6:
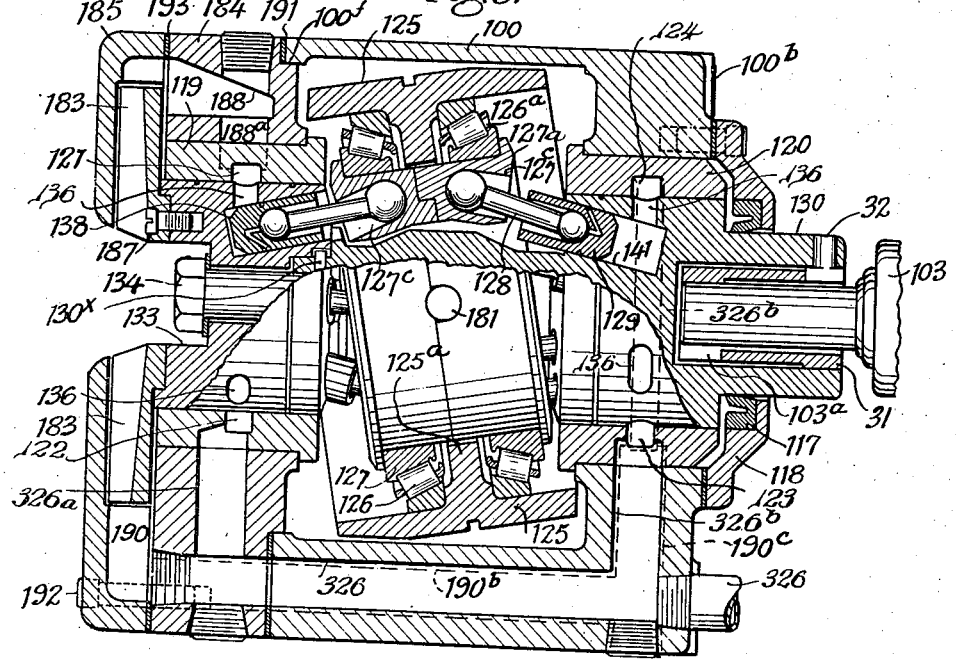
Fig. 6 is a longitudinal section through the pump unit showing the cradle, shafting, coupling, and also the centrifugal supercharging pump which is applied to the end of the pump shaft.

The pump unit (Fig. 6) is housed in a casing 100, and the structure is generally similar to that of the motor above described. In the pump unit the shaft 130 is provided with a cylindrical bearing surface journaled in valve bushing 120 which latter is provided with ducts 123 and 124 similar to that of bushing 20 of Fig. 1. The shaft is also provided with a cylindrical head 133 secured by bolt 134 and key 130x to the end of shaft 130, said head being journaled in valve bushing 119 provided with ports 121, 122. In the bearing portions of the shaft 130 and head 133 are cylinders 141 and 138 respectively, provided with ducts 136 respectively connecting the inner ends of the cylinders with the ports 123, 124, 121, 122 of the bushings 120 and 119 respectively, in the same manner as previously described with respect to the corresponding motor parts.

The pump is also provided with a cradle 125 pivoted in the casing 100 similarly to the motor cradle 25, said pump cradle carrying the hub 127—127a supported by roller bearings 126, 126a; and the hub is provided with cylindrical recesses 127c for the heads of the piston rods 128 of pistons 129. Hub 127—127a is driven by shaft 130 through a universal joint having pins such as 181 similar to those of the joint of the motor. Thus the construction and operation of the cradle, pistons, and shaft of the pump are similar to the corresponding parts of the motor, previously described. The pump unit, like the motor unit, has the pump end flange 184 secured to the housing 100 by screws (not shown) and sealed with gasket 191. Cover plate 185 is secured to plate 184 with screws 192 and sealed by gasket 193.

Figures 7, 8:
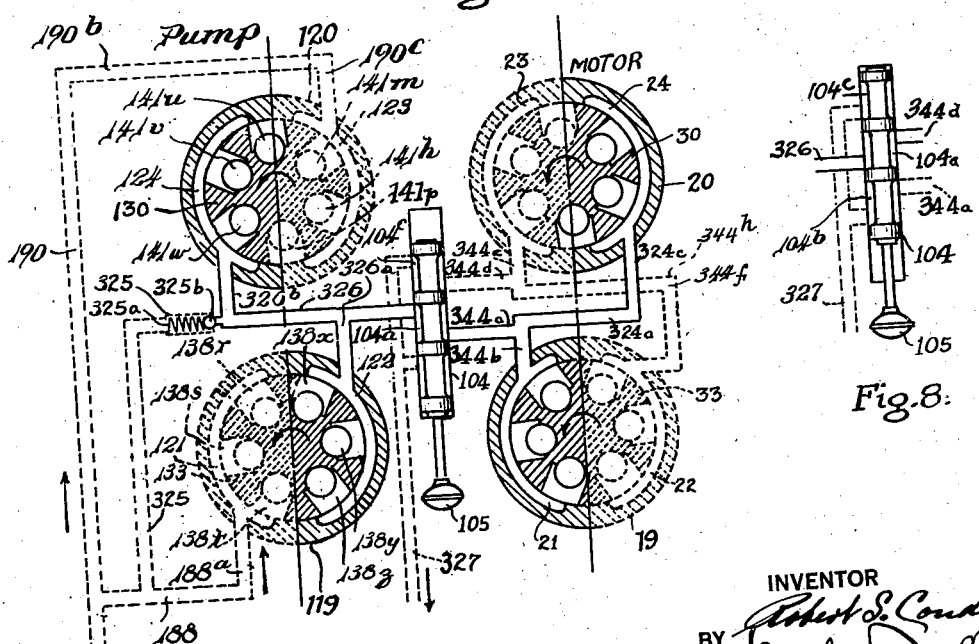
Fig. 7 is a diagrammatic view of the fluid circuit used in the transmission; showing the valve in normal position.
Fig. 8 is a view showing the reversing valve of the fluid circuit in reversing position.

The pump unit, however, is provided with a supercharging centrifugal pump 183 (Fig. 6) which is housed between bushing 119, and cover plate 185, the same being securely mounted on head 133 of shaft 130 by screws 187. The pistons 129 of the pump do not act to draw oil into the cylinders 138—141 since centrifugal pump 183 functions to force oil into the suction side of bushings 120 and 119 by pumping oil along ducts 188, 188a, to port 121 in bushing 119, and through ducts 190, 190b and 190c to port 123 in bushing 120. Port 122 is connected by duct 326a to outlet pipe 326, while port 124 is connected by duct 326b to outlet pipe 326, as shown in Fig. 7, through which the pumped fluid is discharged. In the pump unit the fluid pressure developed by the centrifugal pump 183 holds pistons 129 against the connecting rods 128 and keeps the piston rods seated in their bearings. The centrifugal pump is especially desirable because of its quiet operation and inherent characteristic of attaining its own limit of pressure without the need of an auxiliary relief valve.

The structures of both the motor and pump units are designed for ease in disassembling. Disassembling can be accomplished without removing casings 10 or 100 from their mountings. Disassembly in both units is effected similarly. In the case of the motor, this is accomplished by first removing plates 63 and 65 (Fig. 3) and then removing pivot blocks 69 and 69x, and then removing those parts that support bushings 19 or 20 in one structure. In the case of the pump unit the pump cover 185 must be removed to disengage the centrifugal pump 183 from its mounting on head 133. The cradle 125 may then be removed and shaft 130 together with all intervening parts can be drawn out through the bore 100f as a unit.

Convenience of disassembly and reassembly is a vital factor in servicing as well as manufacture, and coupling 31 is so arranged to permit this method of disassembly. Shafts 30 and 130, being provided with inverted couplings 31 save considerable floor space over conventional types of drives having externally applied couplings. The space saved is approximately ¼ the over-all length of the pump or motor units. The length or dimension along the axis of the drive shaft is the most important dimension, as the electric motor or machine driven by the fluid motor is in most cases of such lateral size that there is considerable lateral clearance to accommodate the motor or pump units. My coupling 31 is especially designed to allow disassembly of the pump or motor without removing casings 10 or 100 from their mountings. This is accomplished in a simple manner by arranging pins 32 assembled into shafts 30 or 130 after coupling 31 is in place and serving to key coupling 31 and hold it in place. Key 103a on the shaft of the prime mover (Fig. 6) is cut away as shown and arranged with a sliding fit in the motor drive shaft. Thus it is seen that pin 32 is of very simple character, yet it keys coupling 31 and holds it in place; also permits compensation for misalignment since it is able to rotate in the hole in which it is mounted in shaft 30 or 130. As this pin is assembled before the motor shaft is brought into place, it has the further advantage of being automatically locked in place by the motor shaft.

As the transmission in nearly every case is driven by an electric motor the actual floor space that the user must plan for is that required for the transmission plus that for the electric motor. In my unit the electric motor 103 is included in the same floor space occupied by the transmission; thus a considerably less amount of floor space is required.

The fact that the fluid connection for a complete transmission can be made by drilling the housing and connecting the pump and motor with ducts which do not require swivel connections, is a definite advantage in economy and provides a reliable construction.

*The fluid transmission*

Fig. 1 illustrates the arrangement of the transmission unit. 101 is a mounting bracket, and 102 a fluid tank secured to the bottom 101b of bracket 101. The electric motor 103 which directly drives the pump 100 is mounted against surface 101a of bracket 101, while the surface 100b of the pump unit is mounted against bottom surface 101b of the bracket 101, and the surface 10b of the motor unit is mounted against plate 10x which is mounted against surface 101c of bracket 101.

Both the pump and motor units are flange mounted, i. e., secured in place by flanges at three points, such as shown at 10c, 10d and 10e (Fig. 3) so that regardless of the condition of the surface upon which the pump or motor is mounted, a twist or cramp will not be set up in the casings 10 or 100, as would otherwise be set up if more than three fastening points were used and either the surface of the unit or the surface upon which it was mounted was not a perfect plane. The twist or cramp due to mounting is particularly objectionable for a fluid unit, because the cylindrical fit between shafts 30 and 130 and their valve bushings is so close that any small amount of twist or cramp in the casings will cause the parts to bind and prevent free rotation.

The position of the pump in the unit (Fig. 1) is such that the supercharging centrifugal pump 183 of the pump is disposed adjacent the bottom of sump tank 102 with the impeller blades disposed parallel with the bottom of the tank so as to be continually primed by the liquid in the tank.

104 (Figs. 1, 7 and 8) designates the reversing valve of the transmission unit, and 105 its handle. The fluid connections between the pump and motor in the transmission unit are shown and explained with Figs. 7 and 8.

The control of the fluid transmission shown in Fig. 1 differs from the control shown in Figs. 3, 4 and 5 in that same is controlled by a lever 210 on a shaft 211 journaled on the side of mounting bracket 101. This lever is manually operated by knob 213 and positioned by a spring loaded plunger 212 which engages any one of a series of holes 214 to secure lever 210 in desired position. The position of lever 210 is denoted by pointer 210a cooperating with dial 215.

Shaft 211 carries an intermittent gear 216, whereby during the motion of lever 210 from its normal zero position shown in Fig. 1 to its mid-position (215b on dial 215), the intermittent gear 216 will rotate and drive an intermittent gear 217, on shaft 161 of the pump cradle adjusting means, and thus the pump cradle 125 will be rotated on its pivots 168 from the minimum stroke position (shown in Fig. 1) to a position to impart a greater stroke to the pump pistons 129, the eccentric pin 161a of shaft 161 engaging the slide block 162 in the cradle block 169 which is secured to the cradle 125 in the same manner as the cradle block 69, block 62, and pin 61a of shaft 61 shown in Fig. 4 operate.

Further rotation of lever 210 in the same direction will bring the cylindrical portion 216c of gear 216 into engagement with the arcuate portion 217a of gear 217, and will thereby lock the gear 217 in such position while lever 210 is being shifted from the position 215b of dial 215 to position 215c. Thus during the first half of the movement of lever 210 the pump cradle 125 is tilted to increase the stroke of the pump pistons 129 from the minimum to the maximum.

During the same first half of the movement of hand lever 210 the cylindrical surface 216c maintains an engagement with the arcuate portion 219a of the motor cradle shifting means, thus locking the intermittent gear 219 of the motor against rotation. The second half of the movement of hand lever 210 moves the motor cradle 25 from its normal position of maximum tilt (shown in Fig. 1) to a position of minimum tilt, for when the lever 210 is shifted into dial position 215b, gear tooth 216b engages slot 219b, and while lever 210 is moved from position 215b to position 215c, gear 219 is rotated therewith. Thus intermittent gear 219 rotates shaft 61 of the motor cradle control to shift pin 61a and move slide block 62 in cradle block 69 and thus rotate the motor cradle 25 about its pivots 68 to a position of less tilt.

The normal position of tilt of pump cradle 125 shown in Fig. 1 represents that at which a low delivery of fluid is pumped. This low delivery when passed through the motor with the motor cradle 25 in the position of greatest tilt (which would require a large displacement of pistons 29 for each rotation of shaft 30) results in a low rotational speed imparted to the motor shaft 30 of the transmission; and therefore in such position the constant speed motor 103 of the pump would operate to rotate motor shaft 30 at the latter's lowest speed. The fluid circuit of the transmission unit contains a relief valve 325 connected in the duct which leads from the delivery side of the pump, said relief valve protecting the pump from overload, and since this relief valve 325 also limits the pressure obtainable from the pump it is a factor in limiting the horsepower output of the pump, the horsepower being a function of delivery and pressure. To obtain additional horsepower output of the pump, when its upper pressure limit is thus fixed, it is necessary to increase the delivery of the pump. Thus in a fluid transmission, when the increase in speed of rotation of the motor shaft 30 is accomplished by first increasing the delivery of the pump to its maximum figure, the horsepower delivery from the pump can therewith be increased to its maximum figure. It is for this reason that the intermittent gears 216, 217 and 219 are employed in my transmission, so that the first half of the rotation of hand lever 210 will function to increase the delivery of the pump without altering the displacement of the pistons 29 of the motor unit. As the first half of the rotation of lever 210 has effected an increase in R. P. M. of motor shaft 30 by increasing the delivery of the pump to its maximum amount, the second half of the rotation of this lever 210 can only act to decrease the displacement of the motor pistons 29 to further increase the speed of the motor shaft.

Figs. 7 and 8 illustrate the fluid connections between the tank 102, pump 100, and motor 10. This circuit is a so-called "open" fluid circuit since the fluid is taken from the open tank 102, as explained above, by the centrifugal pump 183 and forced into the pump pistons 129, and from the pump it is forced beyond the relief valve 325 to the motor pistons 29; and then discharged from the motor to the open tank 102 again.

Fig. 7 indicates six cylinders in the shaft 130 of the pump and in the shaft 30 of the motor displaced 30° with respect to the six cylinders in the head 133 of the pump and head 33 of the motor respectively. Thus the delivery of the cylinders in the groups is staggered so that there will be twelve impulses for each revolution. The even number of cylinders in each group maintains three pressure cylinders in each group at all times so that the end thrust is constant in amount and is balanced by the end thrust of the three pressure cylinders in the opposing cylinders. That portion of the drawing shown in Fig. 7 by dotted lines represents the side of the pump and motor that is under supercharging or exhaust pressures respectively, and the portions shown in solid lines represent the sides of the pump and motor that are under operating pressure. Thus as shown, the cylinders 141m and 141n and 141p in pump shaft 130, and cylinders 138r, 138s and 138t of pump head 133 are on the supercharged side of the pump.

Fluid is pumped under low pressure from the sump 102 by the centrifugal pump 183 (not shown) and conveyed through ducts 190, 190b, and 190c to port 123 of pump bushing 120 and through ducts 188, 188a to port 121 of the pump head bushing 119. This fluid enters the cylinders 141m, 141n, 141p, 138r, 138s, and 138t. The cylinders 141u, 141v, 141w, of shaft 130 and cylinders 138x, 138y and 138z, of pump head 133 are on the pressure side of the pump, and fluid from these cylinders is delivered to ports 124 and 122. From port 124 the fluid is transmitted along duct 326b and 326 to the chamber 104a of reversing valve 104. From port 122 the fluid is transmitted along ducts 326a and 326 to chamber 104a of valve 104. If the fluid rises in pressure above a definite maximum pressure it will be allowed to escape along duct 325 and back to the sump 102 by raising ball 325b from its seat and compressing spring 325a. Fluid from valve chamber 104a (in the position of the valve shown in Fig. 7) is conducted under pressure to the receiving side of the motor through ducts 344a and 344b and to port 21 of motor bushing 19, and by way of ducts 324a and 324c to port 24 of motor bushing 20. The discharge from the exhaust side of the motor is effected by duct 344f, 334h and 344d from port 22 and by duct 344e and 344d from port 23 to an adjacent valve chamber 104c and thence along duct 327 back to the sump tank 102. To reverse the direction of rotation of the motor, plunger valve 104 is pushed by hand knob 105 to the opposite end of its chamber as shown in Fig. 8. In this position of the valve, chamber 104a connects duct 326 to duct 344d; and chamber 104b connects duct 344a to duct 327. Thus the normal exhaust side of the motor becomes the pressure side, and the normal pressure side of the motor becomes the exhaust side.

Any air in the circulating fluid escapes in the open tank 102 by rising to the top thereof, and same is not recirculated through the transmission, resulting in a quiet operating unit. The motor discharges only against atmospheric pressure and is not required to overcome back pressures, and thus the peak pressure of the transmission can be reduced by the amount of back pressure for a given power transmission. The heat generated in the fluid is dissipated through the walls of the sump upon return thereto of the fluid.

In operation

In the normal position of lever 210 (Fig. 1), the pump cradle 125 is in its minimum tilt position, while the motor cradle 25 is held in maximum tilt position by engagement of arcuate surface 216c of gear 216 with the concave portion 219a of gear 219. When valve 104 is in the position shown in Fig. 7, and prime mover 103 is actuated, pump shaft 130 (and head 133) is rotated in a counter-clockwise direction as shown by the arrows in Fig. 7, so that the pistons in pump shaft 130 to the left of the vertical in Fig. 7, and the pump pistons in head 133 to the right of said vertical, will be discharging. Centrifugal pump 183 delivers fluid from tank 102 into ports 123 and 121 of the pump, which fluid enters the cylinders and is carried around and delivered through the ports 124 and 122 to the outlet duct 326 leading to the port 104a, valve 104, relief valve 325b limiting the pressure of the fluids. The fluid from valve port 104a passes through duct 344a into the ports 24 and 21 of the motor rotating the motor shaft 30 (and head 33) in the direction of the arrows (Fig. 7), the fluid being discharged through ports 23 and 22, ducts 344h and 344d, valve port 104c, and pipe 327 back into tank 102. If, however, valve 104 is shifted into the position shown in Fig. 8, the direction of rotation of the motor shaft 30 is reversed, since duct 344d then becomes the fluid feed duct, and duct 344a the fluid discharge duct of the motor.

Since the six cylinders in each of the shafts 130 and 30 are displaced 30° with respect to the six cylinders in each of the heads 133 and 33 of the pump and motor respectively, there will be twelve fluid impulses instead of six for each revolution thereby providing double displacement and double the number of impulses, while permitting use of shafts of minimum diameter and consequent use of valve housings of minimum diameter and also providing minimum peripheral speeds at the valve ports; also the double number of impulses reducing the pressure variation created by the pump, and thereby reducing vibration of the motor.

As lever 210 is rotated through the first half of its movement, pump cradle 125 is rotated from its position of minimum tilt to its position of maximum tilt, while the motor cradle 25 is maintained at its position of maximum tilt, and thus during such movement the volume of fluid delivered by the pump to the motor is increased to its maximum amount developing the horsepower of the pump and at the same time effecting increase in the motor shaft speed by increase in fluid circulation. Further movement of lever 210 merely acts to decrease the displacement of the motor pistons, thereby further increasing the speed of the motor shaft.

Modification

Figure 9:
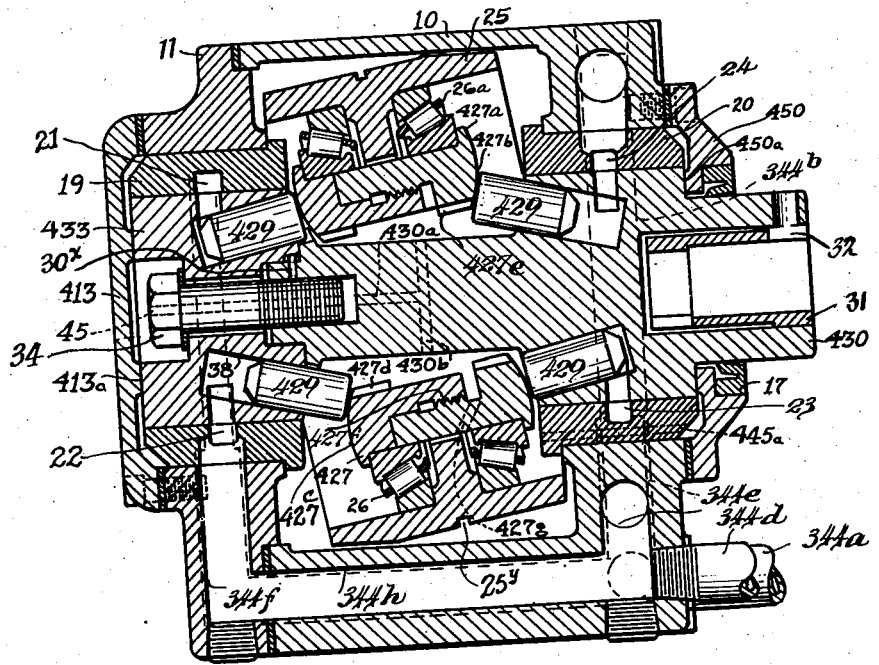
Fig. 9 is a longitudinal section showing a modified and simplified piston construction for the pump or motor of the unit.

Fig. 9 shows a simplified embodiment of the motor unit, the construction being also equally applicable to the pump unit. Parts 10, 11, 17, 19, 20, 25, 26 and 26a are identical to those shown in Fig. 2 and function in the same manner. Pistons 429 engage the sides of hub 427—427a directly without utilizing intervening piston rods (such as rods 28 shown in Fig. 2), the outer ends of pistons 429 engaging the curved surfaces 427b and 427c of hub members 427—427a. This method of engagement promotes rotation of the pistons 429 in their cylinders while the pistons operate through their strokes, the pistons rolling along the curved surfaces 427b—427c of the hub. During this period of engagement the pistons contact on their sides so that the relative radial contact acts to rotate the pistons in their cylinders.

In this modification the universal joint (shown in Fig. 3) is not used. The hub 427—427a is free to rotate, and is in fact driven rotatively by the action of pistons 429. 427d and 427e are notches serving as wrench keys when hub members 427 and 427a are fastened together by threads 427f.

Shafts 430 and 433 are held longitudinally by end plates 450 and 413 which engage bearing surfaces 450a and 413a respectively. Any fluid leaking past the seal between bushing 19 and head 433 enters bore 45 in bolt 34 and is conveyed by centrifugal force to bearings 26 and 26a along ducts 430a, 430b and 427g. Any fluid leaking past the seal between shaft 430 and bushing 20 is carried back into the housing by duct 445a. The valve operation, control and general arrangement when using pumps or motors of the type shown in Fig. 9 is similar to that previously described with respect to Figs. 1–8.

I claim:

1. In combination, a casing having an open end and having a partly closed end forming a bore; an annular cap of substantially same diameter as the casing closing the open end of the casing and forming another bore; cylindrical bushings in said bores having valve ports connected in a fluid circuit; a shaft having one end entering the casing and having cylindrical enlargements journaled in said bushings; a hub of less diameter than the open end of the casing surrounding the shaft between the bushings; removable supports for the hub; opposed sets of cylinders in the shaft at opposite sides of the hub having ducts registering with the valve ports; pistons in said cylinders engaging the hub and centering the shaft in the bushings; and means for tilting the hub to vary the strokes of the pistons; whereby when the supports and annular cap are removed the shaft assembly may be withdrawn as a unit through the open end of the casing.

2. In a combination as set forth in claim 1, said cylinders being disposed obliquely to the axis of the shaft and disposed within the cylindrical enlargements; said shaft having an enlargement intermediate its ends within the hub provided with a transverse bore; a pin extending through the bore and having its ends slidably engaging opposed recesses in the hub; and a member transfixing the pin normal to the axis thereof and maintaining the pin in the bore whereby the hub will be rotated by the shaft.

3. In a combination as set forth in claim 1, said supports comprising a cradle pivoted in the casing carrying the hub; a block carried by the cradle having a recess; a slide reciprocably mounted in the recess; and said tilting means comprising a rock shaft journaled in the casing having an eccentric member engaging the slide; and means for rocking the rock shaft.

4. In combination, a casing having an open end and having a partly closed end forming a bore; an annular cap of substantially same diameter as the casing closing the open end of the casing and forming another bore; cylindrical bushings in said bores having valve ports connected in a fluid circuit; a shaft having the end entering the casing and having a cylindrical enlargement journaled in one bushing; a removable cylindrical head on said shaft journaled in the other bushing; a hub of less diameter than the open end of the casing surrounding the shaft between the bushings; removable supports for the hub; opposed sets of cylinders in the shaft and head at opposite sides of the hub having ducts registering with the valve ports; and pistons in said cylinders engaging the hub and centering the shaft in the bushings; whereby when the supports and annular cap are removed the shaft assembly may be removed as a unit through the open end of the casing.

5. In combination, a casing having an open end and having a partly closed end forming a bore; an annular cap of substantially same diameter as the casing closing the open end of the casing and forming another bore; cylindrical bushings in said bores having valve ports connected in a fluid circuit; a shaft having one end entering the casing and having cylindrical enlargements journaled in said bushings; a hub surrounding the shaft between the bushings; opposed sets of cylinders in the shaft at opposite sides of the hub having ducts registering with the valve ports; and centering the shaft in the bushings; pistons in said cylinders engaging the hub; said casing having removable side plates carrying aligned trunnions; a cradle of less diameter than the open end of the casing pivoted in said trunnions and carrying the hub; and means for tilting the cradle to vary the stroke of the piston; whereby when the side plates, and annular cap are removed the shaft assembly including the hub and cradle may be removed through the open end of the casing.

6. In a combination as set forth in claim 5, said tilting means comprising a block carried by the cradle having a recess; a slide reciprocably mounted in the recess; a rock shaft journaled in one side plate having an eccentric member engaging the slide; and means for rocking the rock shaft.

ROBERT S. CONDON.